(12) United States Patent
Peng (10) Patent No.: US 10,274,785 B2
(45) Date of Patent: Apr. 30, 2019

(54) LIQUID CRYSTAL DISPLAY PANEL COMPRISING PIXEL ELECTRODE SLITS AT BOUNDARIES BETWEEN PHOTIC AREAS OF A SUB-PIXEL UNIT HAVING DIFFERENT ALIGNMENT DIRECTIONS AND DISPLAY DEVICE

(71) Applicant: Shenzhen China Star Optoelectronics Technology Co., Ltd., Shenzhen (CN)

(72) Inventor: Bangyin Peng, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 162 days.

(21) Appl. No.: 15/118,103

(22) PCT Filed: Jun. 17, 2016

(86) PCT No.: PCT/CN2016/086221
§ 371 (c)(1),
(2) Date: Aug. 11, 2016

(87) PCT Pub. No.: WO2017/166440
PCT Pub. Date: Oct. 5, 2017

(65) Prior Publication Data
US 2017/0285409 A1    Oct. 5, 2017

(51) Int. Cl.
*G02F 1/1337* (2006.01)
*G02F 1/1343* (2006.01)

(52) U.S. Cl.
CPC ...... *G02F 1/133707* (2013.01); *G02F 1/1337* (2013.01); *G02F 1/133753* (2013.01); *G02F 1/134309* (2013.01); *G02F 2001/133757* (2013.01); *G02F 2001/133776* (2013.01); *G02F 2001/134345* (2013.01)

(58) Field of Classification Search
CPC ........ G02F 2001/133757; G02F 2001/133776; G02F 1/13378; G02F 1/133784; G02F 1/13743
See application file for complete search history.

(56) References Cited

U.S. PATENT DOCUMENTS

2009/0086141 A1* 4/2009 Shoraku ............ G02F 1/133512
349/123
2009/0284703 A1* 11/2009 Shoraku ............ G02F 1/133753
349/129

(Continued)

FOREIGN PATENT DOCUMENTS

CN    103323993    9/2013
CN    105093666    11/2015

(Continued)

*Primary Examiner* — Paul C Lee (57) ABSTRACT

A liquid crystal display panel and a display device are provided. The liquid crystal display panel has a plurality of sub-pixel units, and each of the sub-pixel units has four photic areas. The liquid crystal display panel further has slits arranged in corresponding positions of an upper electrode and/or a lower electrode corresponding to a boundary of adjacent photic areas, and an opening direction of the slits is parallel to an alignment direction of liquid crystal molecules in the photic area where the slits are located at. The corresponding dark fringes can be effectively reduced by arranging the slits in the upper electrode or the lower electrode.

6 Claims, 5 Drawing Sheets

(56) References Cited

U.S. PATENT DOCUMENTS

| | | | | |
|---|---|---|---|---|
| 2010/0157223 A1* | 6/2010 | Shin | ................ | G02F 1/133753 |
| | | | | 349/129 |
| 2011/0299019 A1 | 12/2011 | Sasaki et al. | | |
| 2012/0154727 A1* | 6/2012 | Chang | ............... | G02F 1/133707 |
| | | | | 349/129 |
| 2013/0027640 A1* | 1/2013 | Lee | ................. | G02F 1/133753 |
| | | | | 349/96 |
| 2014/0307210 A1* | 10/2014 | Wei | ................. | G02F 1/133707 |
| | | | | 349/123 |
| 2015/0277166 A1* | 10/2015 | Kim | ................. | G02F 1/133707 |
| | | | | 349/128 |
| 2018/0052370 A1 | 2/2018 | Yao et al. | | |

FOREIGN PATENT DOCUMENTS

| | | | |
|---|---|---|---|
| CN | 105116644 | | 12/2015 |
| CN | 105204244 | | 12/2015 |
| EP | 0987582 | | 3/2000 |
| JP | 2009151204 A | * | 7/2009 |

\* cited by examiner

Fig. 1

PRIOR ART

LIQUID CRYSTAL DISPLAY PANEL COMPRISING PIXEL ELECTRODE SLITS AT BOUNDARIES BETWEEN PHOTIC AREAS OF A SUB-PIXEL UNIT HAVING DIFFERENT ALIGNMENT DIRECTIONS AND DISPLAY DEVICE

RELATED APPLICATIONS

This application is a National Phase of PCT Patent Application No. PCT/CN2016/086221 having International filing date of Jun. 17, 2016, which claims the benefit of priority of Chinese Patent Application No. 201610190261.3 filed on Mar. 30, 2016. The contents of the above applications are all incorporated by reference as if fully set forth herein in their entirety.

FIELD OF THE INVENTION

The present invention relates to display technology, and more particularly to a liquid crystal display panel and a display device using the liquid crystal display panel.

FIELD AND BACKGROUND OF THE INVENTION

Ultraviolet vertical alignment (UV2A) technology is a technology of using the ultraviolet light for aligning the liquid crystal molecules of the vertical alignment liquid crystal display. The basic principle is to coat a polymer material alignment film which reacts to ultraviolet light on a glass substrate. Under the irradiation of the ultraviolet light, the polymer main chain on the surface of the polymer can be tilted along the direction of the ultraviolet irradiation, so that the liquid crystal molecules can be tilted along the direction of the main chain. At present, this technology is mainly used in vertical alignment mode liquid crystal display with large viewing angle for improving the opening rate, contrast ratio, and response speed of the liquid crystal display with large viewing angle.

Since UV2A technology uses a special orthogonal vertical light alignment method, " 卐 " symbol dark fringes might be formed on the sub-pixels of the liquid crystal display in the bright state. The appearance of the " 卐 " symbol dark fringes reduces the transmittance of liquid crystal display. In order to solve this problem, the methods currently used are: extrapolating the edges of the " 卐 " symbol dark fringes to the black matrix, using the black matrix to block the edges of the " 卐 " symbol dark fringes, or designing the specific location of the edge of the upper electrode as a radioactive slit for shifting an acting force of the edge of the electric field of the ITO electrode which is applied to the liquid crystal molecules, thereby moving the horizontal and vertical dark fringes caused by the edge field effect out of an opening area of the ITO. However, the methods only reduce the horizontal and vertical dark fringes on the edge of the " 卐 " symbol dark fringes, but have no influence on the cross dark fringes in the middle of the " 卐 " symbol dark fringes.

Therefore, it is necessary to provide a liquid crystal display panel and a display device using the liquid crystal display panel to solve the problems of the prior art through the slit is arranged at the corresponding position of the upper electrode and the lower electrode. When the liquid crystal display is in the bright state, the liquid crystal molecules are deflected correspondingly by the electric field effect of the slit. Thus, a position originally as the cross dark fringe in the sub pixel has a certain light emitted, thereby weakening the cross dark fringe and increasing the transmittance of the liquid crystal display panel.

SUMMARY OF THE INVENTION

The embodiment of the present invention provides a liquid crystal display panel for weakening the dark fringes and increasing the transmittance of the liquid crystal display panel.

The embodiment of the present invention provides a liquid crystal display panel comprising a plurality of sub-pixel units. Each of the sub-pixel units is constructed by an upper electrode, a liquid crystal layer, and a lower electrode. The sub-pixel unit has four photic areas, the adjacent photic areas have different alignment directions from each other. Boundaries of the adjacent photic areas comprise a horizontal boundary or a vertical boundary.

The liquid crystal display panel further comprises slits arranged periodically in corresponding positions of the upper electrode and/or the lower electrode corresponding to the boundaries of the adjacent photic areas, an opening direction of the slit is parallel to an alignment direction of liquid crystal molecules in the photic areas where the slits are located at. The slits form an angle of 45 degrees with respect to the corresponding positions of the upper electrode and/or the lower electrode corresponding to the horizontal boundary or the vertical boundary.

In the liquid crystal display panel described above, the slits are respectively disposed at both sides of the corresponding positions of the upper electrode and/or the lower electrode corresponding to the horizontal boundary of the adjacent photic areas.

In the liquid crystal display panel described above, the slits located at both sides of the corresponding positions of the upper electrode and/or the lower electrode corresponding to the horizontal boundary of the adjacent photic areas are interlinked to each other.

In the liquid crystal display panel described above, the slits are respectively disposed at both sides of the corresponding positions of the upper electrode and/or the lower electrode corresponding to the vertical boundary of the adjacent photic areas.

In the liquid crystal display panel described above, the slits located at both sides of the corresponding positions of the upper electrode and/or the lower electrode corresponding to the vertical boundary of the adjacent photic areas are interlinked to each other.

In the liquid crystal display panel described above, the slits are respectively disposed at both sides of the corresponding positions of the upper electrode and/or the lower electrode corresponding to the horizontal boundary and the vertical boundary of the adjacent photic areas.

In the liquid crystal display panel described above, an intersection of the horizontal boundary and the vertical boundary is a junction center, the slits are disposed in the corresponding positions of the upper electrode and/or the lower electrode corresponding to the horizontal boundary and/or the vertical boundary within a predetermined distance from the junction center.

In the liquid crystal display panel described above, the adjacent slits located at the corresponding positions of the upper electrode and/or the lower electrode corresponding to the junction center within the same distance from the junction center are interlinked to each other.

The embodiment of the present invention provides a liquid crystal display panel comprising a plurality of sub-pixel units. Each of the sub-pixel units is constructed by an upper electrode, a liquid crystal layer and a lower electrode. The sub-pixel unit has four photic areas, the adjacent photic areas have different alignment directions from each other. Boundaries of the adjacent photic areas comprise a horizontal boundary or a vertical boundary.

The liquid crystal display panel further comprises slits arranged periodically in the corresponding positions of the upper electrode and/or the lower electrode corresponding to the boundaries of the adjacent photic areas, an opening direction of the slits is parallel to an alignment direction of liquid crystal molecules in the photic areas where the slits are located in.

In the liquid crystal display panel described above, the slits are respectively disposed at both sides of the corresponding positions of the upper electrode and/or the lower electrode corresponding to the horizontal boundary of the adjacent photic areas.

In the liquid crystal display panel described above, the slits located at both sides of the corresponding positions of the upper electrode and/or the lower electrode in the horizontal boundary of the adjacent photic areas are interlinked to each other.

In the liquid crystal display panel described above, the slits are respectively disposed at both sides of the corresponding positions of the upper electrode and/or the lower electrode corresponding to the vertical boundary of the adjacent photic areas.

In the liquid crystal display panel described above, the slits located at both sides of the corresponding positions of the upper electrode and/or the lower electrode corresponding to the vertical boundary of the adjacent photic areas are interlinked to each other.

In the liquid crystal display panel described above, the slits are respectively disposed at both sides of the corresponding positions of the upper electrode and/or the lower electrode corresponding to the horizontal boundary and the vertical boundary of the adjacent photic areas.

In the liquid crystal display panel described above, the slits located at both sides of the corresponding positions of the upper electrode and/or the lower electrode corresponding to the horizontal boundary and the vertical boundary of the adjacent photic areas are interlinked to each other.

In the liquid crystal display panel described above, an intersection of the horizontal boundary and the vertical boundary is a junction center, the slits are disposed in the corresponding positions of the upper electrode and/or the lower electrode corresponding to the horizontal boundary and/or the vertical boundary within a predetermined distance from the junction center.

In the liquid crystal display panel described above, the adjacent slits located at the corresponding positions of the upper electrode and/or the lower electrode corresponding to the junction center within the same distance from the junction center are interlinked to each other.

In the liquid crystal display panel described above, the slits located corresponding to the boundaries of the adjacent photic areas are arranged periodically.

In the liquid crystal display panel described above, the slits form an angle of 45 degrees with respect to the corresponding positions of the upper electrode and/or the lower electrode corresponding to the horizontal boundary or the vertical boundary.

The embodiment of the present invention provides a display device, which comprises the liquid crystal display panel described above.

In comparison with the conventional technology, in the liquid crystal display panel of the present invention, the slits are arranged at the corresponding positions of the upper electrode and/or the lower electrode according to the upper electrode and/or the lower electrode corresponding to the border of the adjacent photic areas, and the opening direction of the slit is parallel to an alignment direction of liquid crystal molecules in the photic areas where the slits are located at. When the liquid crystal display is in the bright state, that is a voltage is applied between the upper electrode and the lower electrode, the electric field at the slit will induce the liquid crystal molecules at the dark fringes deflected. Thus, the deflection direction of the liquid crystal molecule is the same as that of the liquid crystal molecule in the photic area, and the border of adjacent photic areas in the sub pixel unit can have a certain light emission, thereby weakening the cross dark fringe formed by the border of adjacent photic areas in the prior art and increasing the transmittance of the liquid crystal display panel. The display device of the present invention comprises the liquid crystal display panel of the present invention. In comparison with the conventional technology, the display device of the present invention has a higher light transmittance.

BRIEF DESCRIPTION OF THE SEVERAL VIEWS OF THE DRAWING(S)

FIG. 2b is a magnified view of the deflection state of the liquid crystal molecules within a scope of a black frame in FIG. 2a;

DESCRIPTION OF SPECIFIC EMBODIMENTS OF THE INVENTION

In order to more clearly describe the embodiments of the present invention or the conventional technical solutions, the description is used to make a simple introduction of the drawings used in the following embodiments. The following description of the drawings are merely some embodiments of the present invention, those of ordinary skill in the art can also obtain other drawings based on these drawings without creative effort.

A conventional liquid crystal display panel comprises a plurality of sub-pixel units, each of the sub-pixel units is constructed by an upper electrode, an upper alignment film, a liquid crystal layer, a lower alignment film and a lower electrode. The sub-pixel unit has four photic areas, the adjacent photic areas has different alignment directions from each other. The principle of the adjacent photic areas has different alignment directions as follows.

The upper alignment film and the lower alignment film are performed a vertical alignment via a UV2A technology. The alignment direction of the upper alignment film is alternately arranged in a vertical downward direction and a vertical upward direction. The alignment direction of the lower alignment film is alternately arranged in the horizontal leftward direction and the horizontal rightward direction. Each of the sub-pixel units comprises a pair of the upper alignment films in vertically downward direction and vertically upward direction, and a pair of the lower alignment films in the horizontal leftward direction and the horizontal rightward direction. Thus, when the liquid crystal display is in the bright state, the sub-pixel unit will be divided into four photic areas, which are an upper left photic area, an upper right photic area, a lower left photic area and a lower right photic area. For example, in the upper left photic area, since the alignment direction of the upper alignment film is a vertical downward direction, the alignment direction of the lower alignment film is a horizontal leftward direction, the alignment direction of the liquid crystal molecules in the upper left photic area is inclined to the left and lower and the inclined direction forms an angle of 45 degrees with respect to the alignment direction of the upper alignment film in the photic area. Likewise, the alignment direction of the liquid crystal molecules in other photic areas can be known, and is not repeated herein.

However, at the junction of the adjacent photic area, the liquid crystal molecule is neither deflected in accordance with the lower left direction of the liquid crystal molecule in the upper left photic area, nor deflected in accordance with the upper left direction of the liquid crystal molecule in the upper right photic area. The arrangement direction is between the lower left direction and the upper left direction, which leads to the transmittance of the junction is lower than that of the two photic areas. Namely, the dark fringes appear at the junction of the two photic areas.

Figure 1:
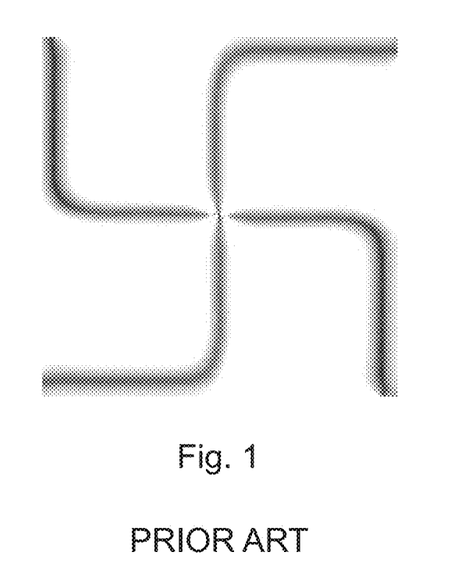
FIG. 1 is a schematic view of a "币" symbol dark fringe in a conventional liquid crystal display panel.

Refer to FIG. 1, which is a schematic view of a "卐" symbol dark fringe in a conventional liquid crystal display panel. The "卐" symbol dark fringe is composed of two parts. One part is a cross dark fringe in the middle portion. The other part is the horizontal and vertical dark fringes at the edge. The embodiment of the present invention provides technical solutions for the cross dark fringe, that is the dark fringes corresponding to the junction between the adjacent photic areas. It can be understood that the cross dark fringes comprise horizontal dark fringes corresponding to a horizontal junction between the adjacent photic areas and vertical dark fringes corresponding to a vertical junction between the adjacent photic areas.

Figure 2A:
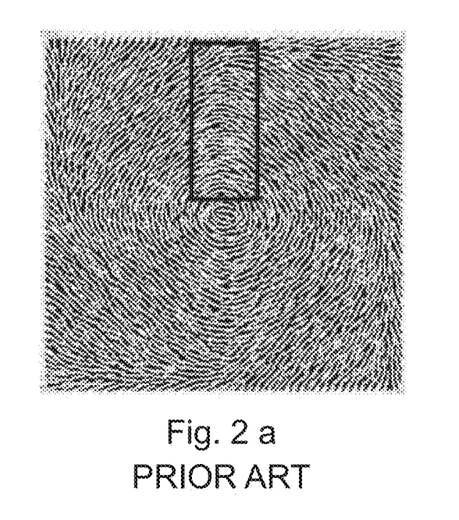
FIG. 2a is a schematic view of a deflection state of liquid crystal molecules corresponding to a conventional sub pixel unit.

In order to further understand the formation of the dark fringes, the present invention provides a schematic view of a deflection state of liquid crystal molecules corresponding to a conventional sub pixel unit, as shown in FIG. 2a. According to the deflection state of liquid crystal molecules, the liquid crystal will be obviously divided into four areas, which are an upper left photic area, an upper right photic area, a lower left photic area and a lower right photic area, and deflection state of liquid crystal molecules in each photic area are essentially the same. The deflection states of the liquid crystal molecules in the adjacent photic areas are different. The deflection state of the liquid crystal molecules at the junction of two adjacent photic areas and the deflection state of the liquid crystal molecules in two photic areas are different. The black frame in FIG. 2a marks the liquid crystal molecules at the junction of the upper left photic area and the upper right photic area.

Figure 2B:
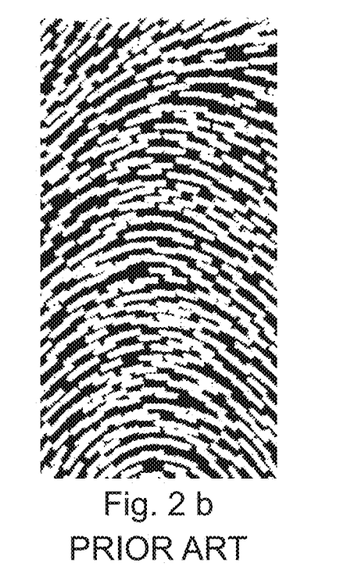

In order to clearly see the deflection state of the liquid crystal molecules, it is enlarged as shown in FIG. 2b. FIG. 2b is a magnified view of the deflection state of the liquid crystal molecules within a scope of the black frame. Referring to the drawings of the present invention, the liquid crystal molecules at the junction are not deflected in accordance with a left downward direction of liquid crystal molecules in the upper left photic area and are not deflected in accordance with a left upward direction of liquid crystal molecules in the upper right photic area. The arrangement direction is between the lower left direction and the upper left direction. Namely, the dark fringes appear at the junction of the two photic areas.

In order to weaken the dark fringes, the present invention provides a liquid crystal display panel comprising a plurality of sub-pixel units. Each of the sub-pixel unit comprises an upper electrode, a liquid crystal layer and a lower electrode. The sub-pixel unit comprises four photic areas, the adjacent photic areas have different alignment directions. A boundary of the adjacent photic areas comprises a horizontal boundary or a vertical boundary. The liquid crystal display panel further comprises slits arranged periodically in corresponding positions of the upper electrode and/or the lower electrode corresponding to a boundary of the adjacent photic areas, an opening direction of the slit is parallel to an alignment direction of liquid crystal molecules in the photic areas where the slits are located at.

Figure 3:
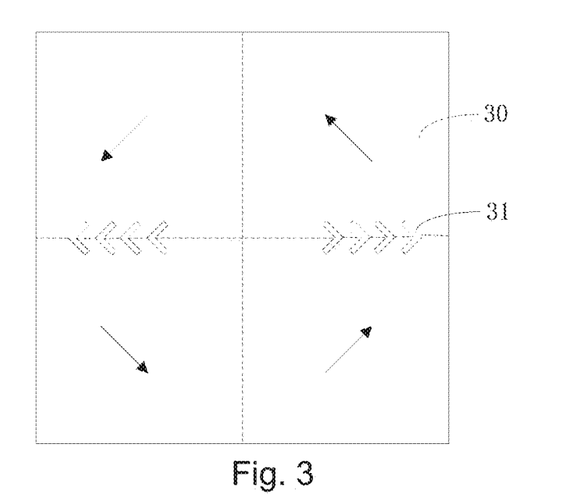
FIG. 3 is a structural schematic view of an upper electrode of a liquid crystal display panel according to a first preferred embodiment of the present invention.

Refer to FIG. 3, which is a structural schematic view of an upper electrode of a liquid crystal display panel according to a first preferred embodiment of the present invention. The arrow in the figure shows the alignment direction of liquid crystal molecules in corresponding photic area.

The slits 31 are disposed on the upper electrode 30 of the liquid crystal display panel. The opening direction of the slit 31 is parallel to an alignment direction of liquid crystal molecules in the photic areas where the slits 31 are located at.

In order to weaken the horizontal dark fringes of the cross dark fringes, preferably, the slits 31 are respectively disposed at both sides of the corresponding positions of the upper electrode corresponding to the horizontal boundary of the adjacent photic areas, and the slits 31 located at the same vertical line are interlinked to each other. It can be understood that the horizontal boundary of the adjacent photic areas means a boundary between an upper left photic area and a lower left photic area, and a boundary between an upper right photic area and a lower right photic area.

Since the liquid crystal molecules are at a deflection of 45 degrees, the liquid crystal has maximum transmittance. Therefore, preferably, the slits 31 form an angle of 45 degrees with respect to the corresponding positions of the upper electrode 30 corresponding to the horizontal boundary. When the liquid crystal display is in the bright state, that is a voltage is applied between the upper electrode 30 and the lower electrode, the electric field at the slit will induce the liquid crystal molecules deflected correspondingly for increasing the transmittance in the boundary, thereby achieving the objective of weakening the horizontal dark fringe in the prior art.

In the preferred embodiment of the present invention, the slits located at the boundary of the adjacent photic areas are arranged periodically, as shown in FIG. 3, the slits located in the upper left photic area and the lower left photic area are certainly arranged periodically and the slits located in the upper right photic area and the lower right photic area are certainly arranged periodically. Of course, in other embodiments, the slits may be not arranged periodically, but not limited to. Simultaneously, the number of the slits, the opening width and other parameters can be set according to the size and the width of the dark fringes, and are not specifically defined.

In the preferred embodiment of the present invention, the slits are respectively disposed at both sides of the corresponding positions of the upper electrode and/or the lower electrode corresponding to the horizontal boundary of the adjacent photic areas. In other embodiments, the slits can be disposed in one side of the corresponding position, but it is not limited thereto.

In the preferred embodiment of the present invention, the slits are disposed in the upper electrode. It can be understood that the slits can be disposed in the lower electrode, or the slits can be disposed in the corresponding positions of the corresponding upper electrode and the lower electrode, as long as the purpose of weakening the horizontal dark fringe can be achieved.

Figure 4:
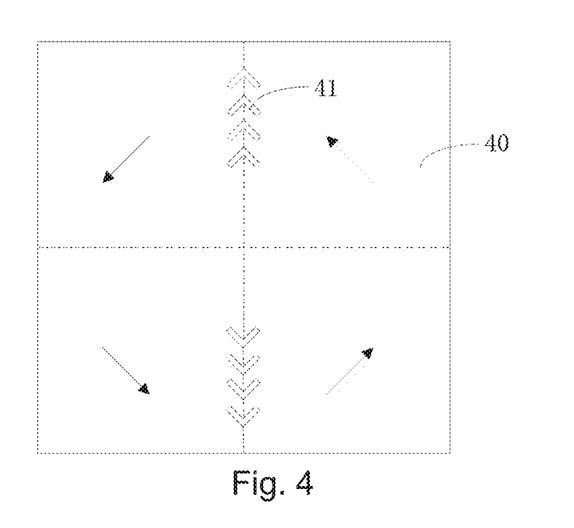
FIG. 4 is a structural schematic view of the upper electrode of the liquid crystal display panel according to a second preferred embodiment of the present invention.

Refer to FIG. 4, which is a structural schematic view of the upper electrode of the liquid crystal display panel according to a second preferred embodiment of the present invention. The arrow in the figure shows the alignment direction of liquid crystal molecules in corresponding photic area.

In the preferred embodiment of the present invention, the slits 41 are disposed on the upper electrode 40 of the liquid crystal display panel. The opening direction of the slit 41 is parallel to an alignment direction of liquid crystal molecules in the photic areas where the slits 41 are located at.

In order to weaken the vertical dark fringes of the cross dark fringes, preferably, the slits 41 are respectively disposed at both sides of the corresponding positions of the upper electrode corresponding to the vertical boundary of the adjacent photic areas, and the slits 41 located in the same horizontal line are interlinked to each other. Since the liquid crystal molecules are at a deflection of 45 degrees, the liquid crystal has maximum transmittance. Therefore, preferably, the slits 41 form an angle of 45 degrees with respect to the corresponding positions of the upper electrode 40 corresponding to the vertical boundary. When the liquid crystal display is in the bright state, that is a voltage is applied between the upper electrode 40 and the lower electrode, the electric field at the slit will induce the liquid crystal molecules deflected correspondingly for increasing the transmittance in the boundary, thereby achieving the objective of weakening the vertical dark fringe.

In the preferred embodiment of the present invention, the slits located at the boundary of the adjacent photic areas are arranged periodically, as shown in FIG. 4, the slits located in the upper left photic area and the upper right photic area are certainly arranged periodically and the slits located in the lower left photic area and the lower right photic area are certainly arranged periodically. Of course, in other embodiments, the slits may be not arranged periodically, but not limited to. Simultaneously, the number of the slits, the opening width and other parameters can be set according to the size and the width of the dark fringes, and are not specifically defined.

In the preferred embodiment of the present invention, the slits are respectively disposed at both sides of the corresponding positions of the upper electrode and/or the lower electrode corresponding to the vertical boundary of the adjacent photic areas. In other embodiments, the slits can be disposed in one side of the corresponding position, but are not limited thereto.

In the preferred embodiment of the present invention, the slits are disposed in the upper electrode. It can be understood that the slits can be disposed in the lower electrode, or the slits can be disposed in the corresponding positions of the corresponding upper electrode and the lower electrode, as long as the purpose of weakening the vertical dark fringe art can be achieved.

Figure 5:
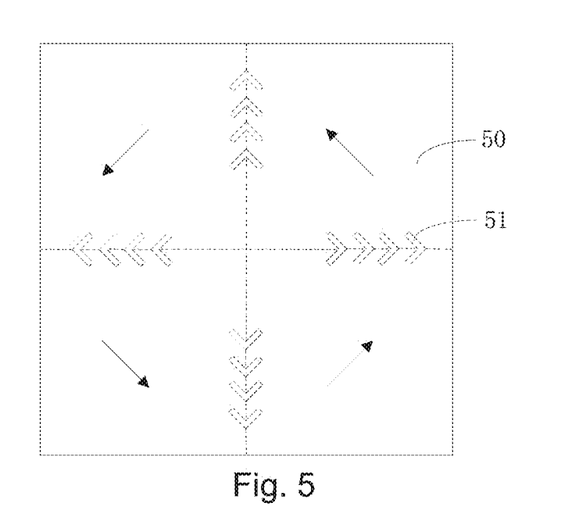
FIG. 5 is a structural schematic view of the upper electrode of the liquid crystal display panel according to a third preferred embodiment of the present invention.

Refer to FIG. 5, which is a structural schematic view of the upper electrode of the liquid crystal display panel according to a third preferred embodiment of the present invention. The arrow in the figure shows the alignment direction of liquid crystal molecules in corresponding photic area.

In the preferred embodiment of the present invention, the slits 51 are disposed on the upper electrode 50 of the liquid crystal display panel. The opening direction of the slit 51 is parallel to an alignment direction of liquid crystal molecules in the photic areas where the slits 51 are located at.

In order to weaken the vertical dark fringes of the cross dark fringes, preferably, the slits 51 are respectively disposed at both sides of the corresponding positions of the upper electrode corresponding to the horizontal boundary and the vertical boundary of the adjacent photic areas, and the slits 51 located in the same horizontal line or in the same vertical line are interlinked to each other. Since the liquid crystal molecules are at a deflection of 45 degrees, the liquid crystal has maximum transmittance. Therefore, preferably, the slits 51 form an angle of 45 degrees with respect to the corresponding positions of the upper electrode 50 corresponding to the horizontal boundary and the vertical boundary. When the liquid crystal display is in the bright state, that is a voltage is applied between the upper electrode 50 and the lower electrode, the electric field at the slit will induce the liquid crystal molecules deflected correspondingly for increasing the transmittance in the boundary, thereby achieving the objective of weakening the horizontal dark fringe and the vertical dark fringe.

In the preferred embodiment of the present invention, the slits located at the boundary of the adjacent photic areas are arranged periodically. Of course, in other embodiments, the slits may be not arranged periodically, but are not limited thereto. Simultaneously, the number of the slits, the opening width and other parameters can be set according to the size and the width of the dark fringes, and are not specifically defined.

In the preferred embodiment of the present invention, the slits are respectively disposed at both sides of the corresponding positions of the upper electrode and/or the lower electrode corresponding to the vertical boundary and the horizontal boundary of the adjacent photic areas. In other embodiments, the slits can be disposed in one side of the corresponding position, but are not limited thereto.

In the preferred embodiment of the present invention, the slits are disposed in the upper electrode. It can be understood that the slits can be disposed in the lower electrode, or the slits can be disposed in the corresponding positions of the corresponding upper electrode and the lower electrode, as long as the purpose of weakening the horizontal dark fringe and the vertical dark fringe can be achieved.

Figure 6:
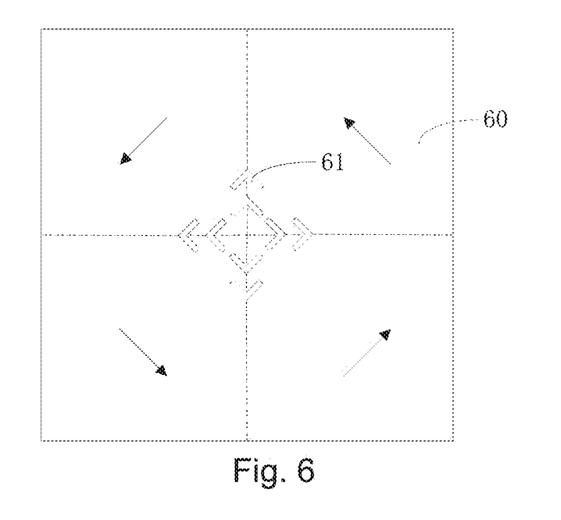
FIG. 6 is a structural schematic view of the upper electrode of the liquid crystal display panel according to a fourth preferred embodiment of the present invention.

Refer to FIG. 6, which is a structural schematic view of the upper electrode of the liquid crystal display panel according to a fourth preferred embodiment of the present invention. The arrow in the figure shows the alignment direction of liquid crystal molecules in corresponding photic area.

In the preferred embodiment of the present invention, the slits 61 are disposed on the upper electrode 60 of the liquid crystal display panel. The opening direction of the slit 61 is parallel to an alignment direction of liquid crystal molecules in the photic areas where the slits 61 are located in.

An intersection of the horizontal boundary and the vertical boundary is a junction center. Preferably, the slits 61 are disposed in the corresponding positions of the upper electrode and/or the lower electrode corresponding to the horizontal boundary and/or the vertical boundary within a predetermined distance from the junction center, and the slits 61 located in the same horizontal line or in the same vertical line are interlinked to each other. Since the liquid crystal molecules are at a deflection of 45 degrees, the liquid crystal has maximum transmittance. Therefore, preferably, the slits 61 form an angle of 45 degrees with respect to the corresponding positions of the upper electrode 60 corresponding to the horizontal boundary and the vertical boundary within the predetermined distance. When the liquid crystal display is in the bright state, that is a voltage is applied between the upper electrode 60 and the lower electrode, the electric field at the slit will induce the liquid crystal molecules deflected correspondingly for increasing the transmittance in the boundary within the predetermined distance of the intersection, thereby achieving the objective of weakening the horizontal dark fringe and the vertical dark fringe.

In the preferred embodiment of the present invention, the slits are disposed in the corresponding positions of the upper electrode corresponding to the vertical boundary and the horizontal boundary within the predetermined distance of the intersection for mainly decreasing the dark fringes at the intersection of the horizontal boundary and the vertical boundary. The specific value of the predetermined distance can be determined according to the size of the dark fringes at the intersection, and are not specifically defined.

In the preferred embodiment of the present invention, the slits are disposed in the corresponding positions of the upper electrode corresponding to the vertical boundary and the horizontal boundary within the predetermined distance of the intersection. In other embodiments, the slit can only disposed in the corresponding positions of the upper electrode corresponding to the vertical boundary or the horizontal boundary, and are not specifically defined.

In the preferred embodiment of the present invention, the slits located at the boundary of the adjacent photic areas are arranged periodically. Of course, in other embodiments, the slits may be not arranged periodically, but are not limited thereto. Simultaneously, the number of the slits, the opening width and other parameters can be set according to the size and the width of the dark fringes, and are not specifically defined.

In the preferred embodiment of the present invention, the slits are disposed in the upper electrode. It can be understood that the slits can be disposed in the lower electrode, or the slits can be disposed in the corresponding positions of the corresponding upper electrode and the lower electrode, as long as the purpose of weakening the dark fringe in the intersection can be achieved.

Figure 7:
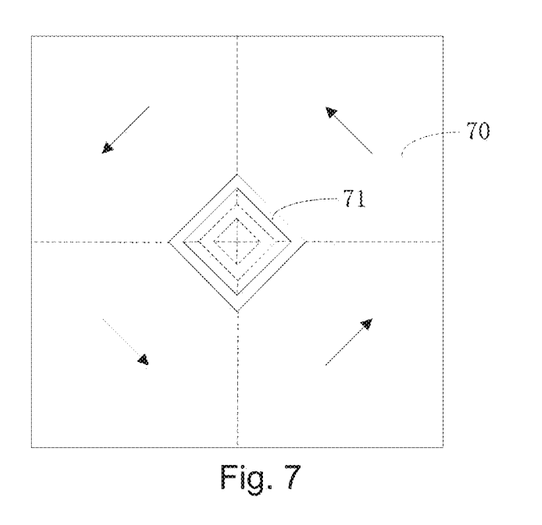
FIG. 7 is a structural schematic view of the upper electrode of the liquid crystal display panel according to a fifth preferred embodiment of the present invention.

Refer to FIG. 7, which is a structural schematic view of the upper electrode of the liquid crystal display panel according to a fifth preferred embodiment of the present invention. The arrow in the figure shows the alignment direction of liquid crystal molecules in corresponding photic area.

In the preferred embodiment of the present invention, the slits 71 are disposed on the upper electrode 70 of the liquid crystal display panel. The opening direction of the slit 71 is parallel to an alignment direction of liquid crystal molecules in the photic areas where the slits 71 are located at.

An intersection of the horizontal boundary and the vertical boundary is a junction center. Preferably, the slits 71 are disposed in the corresponding positions of the upper electrode and/or the lower electrode corresponding to the horizontal boundary and/or the vertical boundary within a predetermined distance from the junction center, and the adjacent slits 71 located at the corresponding positions of the upper electrode 70 corresponding to the junction center within the same distance from the junction center are interlinked to each other, thereby forming a mouth shape as shown in FIG. 7.

Since the liquid crystal molecules are at a deflection of 45 degrees, the liquid crystal has maximum transmittance. Therefore, preferably, the slits 71 form an angle of 45 degrees with respect to the corresponding positions of the upper electrode 70 corresponding to the horizontal boundary and the vertical boundary within the predetermined distance. When the liquid crystal display is in the bright state, that is a voltage is applied between the upper electrode 70 and the lower electrode, the electric field at the slit will induce the liquid crystal molecules deflected correspondingly for increasing the transmittance in the boundary within the predetermined distance of the intersection, thereby achieving the objective of weakening the horizontal dark fringe and the vertical dark fringe.

In the preferred embodiment of the present invention, the slits are disposed in the corresponding positions of the upper electrode corresponding to the vertical boundary and the horizontal boundary within the predetermined distance of the intersection for mainly decreasing the dark fringes at the intersection of the horizontal boundary and the vertical boundary. The specific value of the predetermined distance can be determined according to the size of the dark fringes at the intersection, and are not specifically defined.

In the preferred embodiment of the present invention, the slits which are perpendicular to the opening direction of the slits are arranged periodically. Of course, in other embodiments, the slits may be not arranged periodically, but are not limited thereto. Simultaneously, the number of the slits, the opening width and other parameters can be set according to the size and the width of the dark fringes, and are not specifically defined.

In the preferred embodiment of the present invention, the slits are disposed in the upper electrode. It can be understood that the slits can be disposed in the lower electrode, or the slits can be disposed in the corresponding positions of the corresponding upper electrode and the lower electrode, as long as the purpose of weakening the dark fringe in the intersection can be achieved.

The embodiment of the present invention further provides a display device, which comprises the liquid crystal display panel described above. The display device of the present invention applies the liquid crystal display panel with a higher transmittance, compared with the conventional display device, and thus the display device of the present invention has a higher transmittance. The principles of the liquid crystal display panel with the higher transmittance are described in the description of the liquid crystal display panel aforementioned and not repeated herein.

The present invention has been described with preferred embodiments thereof, and it is understood that many changes and modifications to the described embodiment can be carried out without departing from the scope and the spirit of the invention that is intended to be limited only by the appended claims.

What is claimed is:

1. A liquid crystal display panel, comprising a plurality of sub-pixel units, each of the sub-pixel units constructed by an upper electrode, a liquid crystal layer and a lower electrode, the sub-pixel unit having four photic areas, the adjacent photic areas having different alignment directions from each other, boundaries of the adjacent photic areas comprising a horizontal boundary or a vertical boundary;

wherein slits are arranged periodically in corresponding positions of the upper electrode and/or the lower electrode corresponding to the boundaries of the adjacent photic areas, an opening direction of the slit is parallel to an alignment direction of liquid crystal molecules in the photic areas where the slits are located at, and the slits form an angle of 45 degrees with respect to the corresponding positions of the upper electrode and/or the lower electrode corresponding to the horizontal boundary or the vertical boundary;

wherein the horizontal boundary of the adjacent photic areas comprises a boundary between an upper left photic area and a lower left photic area, and a boundary between an upper right photic area and a lower right photic area; the vertical boundary of the adjacent photic areas comprises a boundary between an upper left photic area and a upper right photic area, and a boundary between an lower left photic area and a lower right photic area; the slits are disposed in the corresponding positions of the upper electrode corresponding to the horizontal boundary or the vertical boundary within a predetermined distance from a junction center, the junction center being a center of an intersection of the horizontal boundary and the vertical boundary;

wherein the slits are respectively disposed at both sides of the corresponding positions of the upper electrode and the lower electrode corresponding to the horizontal boundary of the adjacent photic areas, the slits located at both sides of the corresponding positions of the upper electrode and the lower electrode corresponding to the horizontal boundary of the adjacent photic areas are interlinked to each other;

wherein the slits are respectively disposed at both sides of the corresponding positions of the upper electrode and the lower electrode corresponding to the vertical boundary of the adjacent photic areas, the slits located at both sides of the corresponding positions of the upper electrode and the lower electrode corresponding to the vertical boundary of the adjacent photic areas are interlinked to each other;

wherein the adjacent slits located in the corresponding positions of the upper electrode or the lower electrode corresponding to the junction center within the same distance from the junction center are interlinked to each other.

2. The liquid crystal display panel according to claim 1, wherein the slits are respectively disposed at both sides of the corresponding positions of the upper electrode and the lower electrode corresponding to the horizontal boundary and the vertical boundary of the adjacent photic areas.

3. A liquid crystal display panel, comprising a plurality of sub-pixel units, each of the sub-pixel units constructed by an upper electrode, a liquid crystal layer and a lower electrode, the sub-pixel unit having four photic areas, the adjacent photic areas having different alignment directions from each other, boundaries of the adjacent photic areas comprising a horizontal boundary or a vertical boundary;

wherein slits are disposed in corresponding positions of the upper electrode and/or the lower electrode corresponding to the boundaries of the adjacent photic areas, an opening direction of the slits is parallel to an alignment direction of liquid crystal molecules in the photic areas where the slits are located in;

wherein the horizontal boundary of the adjacent photic areas comprises a boundary between an upper left photic area and a lower left photic area, and a boundary between an upper right photic area and a lower right photic area; the vertical boundary of the adjacent photic areas comprises a boundary between an upper left photic area and a upper right photic area, and a boundary between an lower left photic area and a lower right photic area; the slits are disposed in the corresponding positions of the upper electrode corresponding to the horizontal boundary or the vertical boundary within a predetermined distance from a junction center, the junction center being a center of an intersection of the horizontal boundary and the vertical boundary;

wherein the slits are respectively disposed at both sides of the corresponding positions of the upper electrode and the lower electrode corresponding to the horizontal boundary of the adjacent photic areas, the slits located at both sides of the corresponding positions of the upper electrode and the lower electrode corresponding to the horizontal boundary of the adjacent photic areas are interlinked to each other;

wherein the slits are respectively disposed at both sides of the corresponding positions of the upper electrode and the lower electrode corresponding to the vertical boundary of the adjacent photic areas, the slits located at both sides of the corresponding positions of the upper electrode and the lower electrode corresponding to the vertical boundary of the adjacent photic areas are interlinked to each other;

wherein the adjacent slits located in the corresponding positions of the upper electrode or the lower electrode corresponding to the junction center within the same distance from the junction center are interlinked to each other.

4. The liquid crystal display panel according to claim 3, wherein the slits located corresponding to the boundaries of the adjacent photic areas are arranged periodically.

5. The liquid crystal display panel according to claim 3, wherein the slits form an angle of 45 degrees with respect to the corresponding positions of the upper electrode and the lower electrode corresponding to the horizontal boundary or the vertical boundary.

6. A display device, comprising a liquid crystal display panel according to claim 3.

* * * * *

UNITED STATES PATENT AND TRADEMARK OFFICE
CERTIFICATE OF CORRECTION

PATENT NO. : 10,274,785 B2  
APPLICATION NO. : 15/118103  
DATED : April 30, 2019  
INVENTOR(S) : Bangyin Peng

Page 1 of 1

It is certified that error appears in the above-identified patent and that said Letters Patent is hereby corrected as shown below:

On the Title Page

Item (30) Foreign Application Priority Data  
Insert the following:  
-- Mar. 30, 2016 (CN)..................... 201610190261.3 --

Signed and Sealed this  
Thirteenth Day of August, 2019

Andrei Iancu  
*Director of the United States Patent and Trademark Office*